United States Patent [19]
Kumagai

[11] Patent Number: 5,645,243
[45] Date of Patent: Jul. 8, 1997

[54] RECORDING AND/OR REPRODUCING APPARATUS HAVING CLUTCH MECHANISM

[75] Inventor: Kiyoshi Kumagai, Kanagawa-ken, Japan

[73] Assignee: Canon Kabushiki Kaisha, Tokyo, Japan

[21] Appl. No.: 511,723

[22] Filed: Aug. 7, 1995

[30] Foreign Application Priority Data

Aug. 31, 1994 [JP] Japan .................................. 6-207810

[51] Int. Cl.⁶ .................................................. G11B 15/32
[52] U.S. Cl. ........................... 242/356.5; 192/107 R
[58] Field of Search ........................... 242/356, 356.5; 360/96.3; 192/107 R

[56] References Cited

U.S. PATENT DOCUMENTS 5,318,240  6/1994  Lee ................................ 242/349

FOREIGN PATENT DOCUMENTS 1 193 260  5/1965  Germany ..................... 242/356.5
63-6223    1/1988  Japan ........................... 192/107 R

*Primary Examiner*—John P. Darling
*Attorney, Agent, or Firm*—Robin, Blecker, Daley & Driscoll

[57] ABSTRACT

In a clutch mechanism formed by adhering a friction member to a face of one of a pair of rotating elements with an adhesive member and arranged to bring the surface of the other of the pair of rotating elements into pressed contact with the friction member by an urging member, a recessed part is formed in the face of the one of the rotating elements to which the friction member is adhered, so as to accumulate and retain pressure sensitive adhesive seeping from the adhesive member.

14 Claims, 5 Drawing Sheets

RECORDING AND/OR REPRODUCING APPARATUS HAVING CLUTCH MECHANISM

BACKGROUND OF THE INVENTION

1. Field of the Invention

This invention relates to a clutch mechanism arranged to slippingly transmit rotation between a pair of rotating elements through a friction member such as felt or the like and also to a reel mount device which includes the clutch mechanism as a torque limiter for a video tape recorder, an audio tape recorder or the like.

2. Description of the Related Art

The recording and/or reproducing apparatuses of the kind using tapes as recording media, such as VTRs or the like, have heretofore been arranged to have built-in friction clutch mechanisms (frictional torque limiters) included in their reel mount devices which take up (send out) the tapes, with tape reels mounted thereon, for allowing the tapes to stably travel without being damaged.

The tape driving principle of an ordinary VTR is first described with reference to FIG. 5 as follows. The illustration includes a tape 1 which is a recording medium, a capstan 2, a pinch roller 3, a rotary drum 4 on which a head is mounted, a tension post 5, a take-up reel mount 6 (hereinafter referred to as a T reel mount), a supply reel mount 7 (hereinafter referred to as an S reel mount), a reel mount driving gear 8, an idler gear 9, a take-up side tape 1a which is wound around a take-up reel mounted on the T reel mount 6, and a supply side tape 1b which is wound around a supply reel on the S reel mount 7.

The tape 1 is pulled out from a cassette (not shown) to have a tape path formed in a recordable and/or reproducible state as shown in FIG. 5. In recording or reproducing, the tape 1 is pinched by the capstan 2 and the pinch roller 3 and caused to travel in the direction of arrow at a constant speed by controlling the rotation of the capstan 2. Signals are recorded or reproduced by the head of the rotary drum 4 on or from the traveling tape 1.

In this instance, a tension control mechanism which is not shown applies a back torque to the S reel mount 7, for example, through the tension post 5, a band brake wrapped around the S reel mount 7, a mechanical tension regulator, etc. The back torque is thus applied to effectively prevent the tape 1 from slackening.

The tape 1 sent out at a constant speed by the capstan 2 is taken up and wound by the T reel mount 6 through the reel mount driving gear 8 and an idler gear 9 which is driven by a reel motor. The winding rotational frequency required for the T reel mount 6 changes accordingly as the coil diameter of the take-up side tape 1a wound up by the T reel mount 6 changes. However, this change is absorbed and the winding torque is kept constant by a friction clutch mechanism which is disposed inside the T reel mount 6 in general. The T reel mount 6 is thus arranged to wind the tape 1 by rotating at a constant speed with slipping caused by the clutch mechanism as necessary.

The S reel mount 7 is arranged to act basically in the same manner as the T reel mount 6 when the tape 1 is caused to reversely travel in cases where the tape 1 is to be rewound through a friction clutch mechanism.

The friction clutch mechanism of the reel mount device is described next as follows. FIG. 6 is a sectional view of the T reel mount 6. FIG. 7 is an enlarged sectional view showing a part A shown in FIG. 6. The T reel mount 6 includes a reel mount gear 12 having a gear part formed along it periphery, a reel mount body 13, a reel engaging claw 14, a reel hub mounting face 15 which is located on the reel mount body 13 on the side of the tape, a felt member 16 employed as a friction member, a double-sided tape 17 employed as adhesion means, a thrust spring 18 employed as pressing contact means, a washer 19 and a sliding face 20 of the reel mount gear 12 which is arranged to be in slidable contact with the felt member 16.

The reel mount body 13 is rotatable. The reel mount gear 12 is rotatable coaxially with the reel mount body 13 and is urged in the direction of arrow B in FIG. 7 by the thrust spring 18 through the washer 19. The reel mount gear 12 is thus in a state of being pressed into contact with the felt member 16 which is secured to the reel mount body 13 by means of the double-sided tape 17. The reel engaging claw 14 of the reel mount body 13 is arranged to hold the tape reel hub with the reel hub mounting face 15 and to wind the tape by acting integrally with the reel mount body 13. The tape thus can be wound with the reel mount body 13 rotated by causing the reel mount gear 12 to rotate via the reel mount driving gear 8 at a predetermined rotational frequency while allowing the felt member 16 of the reel mount body 13 to slip over the sliding face 20 of the reel mount gear 12.

A slipping torque (a reel torque) obtained at this time is determined by a load of the thrust spring 18, the diameter of the felt member 16, a coefficient of friction between the felt member 16 and the sliding face 20 of the reel mount gear 12, etc.

There is a general demand for reduction in size of VTRs and particularly in size of camera-integrated type VTRs. To meet this demand, it has become desirous to arrange the mechanism of the reel mount device described above in a smaller size. As a result, the diameter of the felt member 16 tends to become smaller. Then, in order to obtain a desired torque, it has become necessary to increase the load of the thrust spring 18 accordingly.

However, in the case of the conventional device described above, the pressure sensitive adhesive of the double-sided tape 17 used for sticking the felt member 16 has sometimes come to seep under a high ambient temperature condition. In such a case, as shown in FIG. 8, the pressed contact force of the thrust spring 18 causes the pressure sensitive adhesive 21 to seep and spread around from the inner and outer peripheral edges 16a and 16b to the sliding face 20 of the reel mount gear 12. Then, as a result, some abnormality has taken place in frictional sliding between the felt member 16 and the sliding face 20. The abnormal frictional sliding has presented a problem in that it causes a higher reel torque and, in the worst case, brings about a rigidly connected state without slipping.

This problem has resulted from the reduction in diameter and thickness of the felt member 16 and, more particularly, from the trend of increasing the pressed contact force of the thrust spring 18 necessitated by the reduction in size of the reel mount device. This problem might throw impediments in applications of the reel mount device to a compact camera-integrated type VTR.

SUMMARY OF THE INVENTION

The invention under the present application has been developed to solve the above-stated problem of the prior art with a simple structural arrangement. It is, therefore, an object of the invention to provide a clutch mechanism or a recording and/or reproducing apparatus including the clutch mechanism, arranged in such a manner that, where a friction member is fixed to the sticking face of one of rotating elements with an adhesive member, a pressure sensitive adhesive of the adhesive member is prevented from spreading to the sliding face of the other of the rotating elements even if the pressure sensitive adhesive seeps.

To attain this object, a clutch mechanism which is arranged as an embodiment of the invention includes first and second rotating elements supported to be rotatable coaxially, a transmission member fixed to a face of the first rotating element with an adhesive member, urging means for pushing the second rotating element against the transmission member, and a recessed part formed in the face of the first rotating element to which the transmission member is fixed, the recessed part being arranged to accumulate and retain a pressure sensitive adhesive seeping from the adhesive member.

To attain the same object from a different point of view, an apparatus arranged as another embodiment of the invention to record and/or reproduce information on or from a tape includes a first rotating element arranged to be rotated by a drive source, a second rotating element disposed coaxially with the first rotating element and arranged to engage a reel around which the tape is wound, a transmission member fixed to a face of one rotating element of the first and second rotating elements with an adhesive member, urging means for pushing the other rotating element of the first and second rotating elements against the transmission member, and a recessed part formed in the face of the one rotating element to which the transmission member is fixed, the recessed part being arranged to accumulate and retain a pressure sensitive adhesive seeping from the adhesive member.

The above and other objects and features of the invention will become apparent from the following detailed description of embodiments thereof taken in connection with the accompanying drawings.

DETAILED DESCRIPTION OF THE PREFERRED EMBODIMENTS

Some of preferred embodiments of the invention where the invention is applied to reel mount devices of VTRs are described below with reference to FIGS. 1 to 4.

Figure 1:
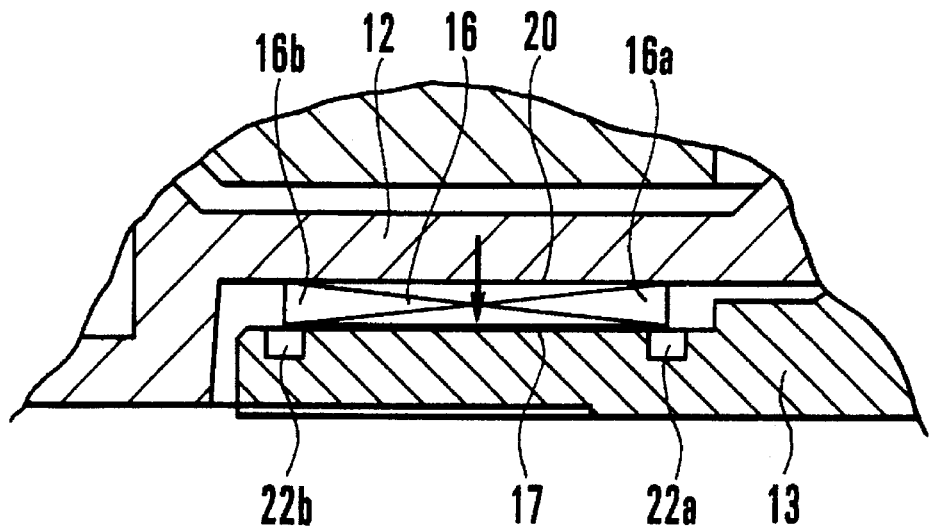
FIG. 1 is an enlarged sectional view showing essential parts of a reel mount device of a VTR to which the invention is applied as a first embodiment thereof.
Figure 2:
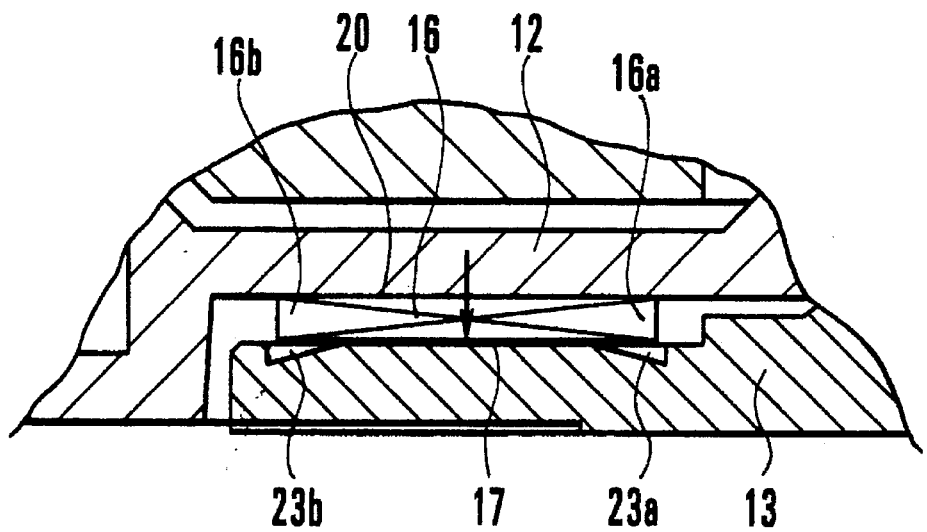
FIG. 2 is an enlarged sectional view showing essential parts of a second embodiment of the invention.
Figure 3:
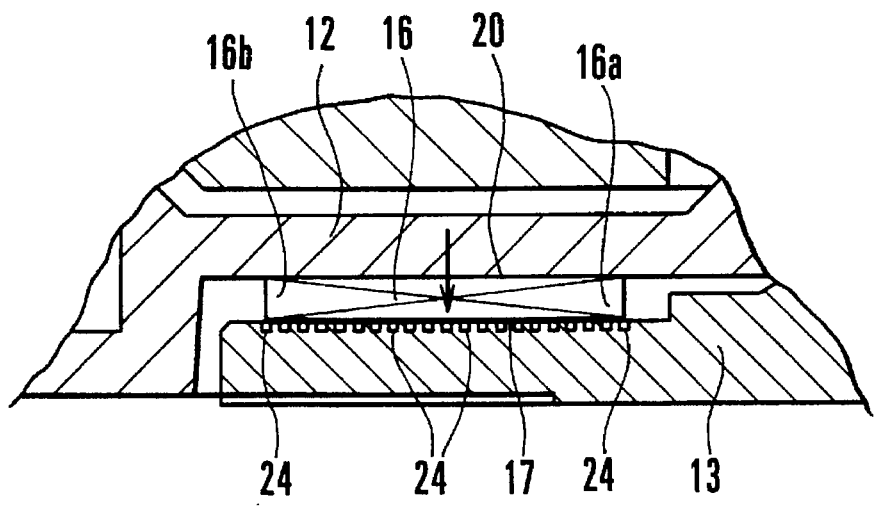
FIG. 3 is an enlarged sectional view showing essential parts of a third embodiment of the invention.
Figure 4:
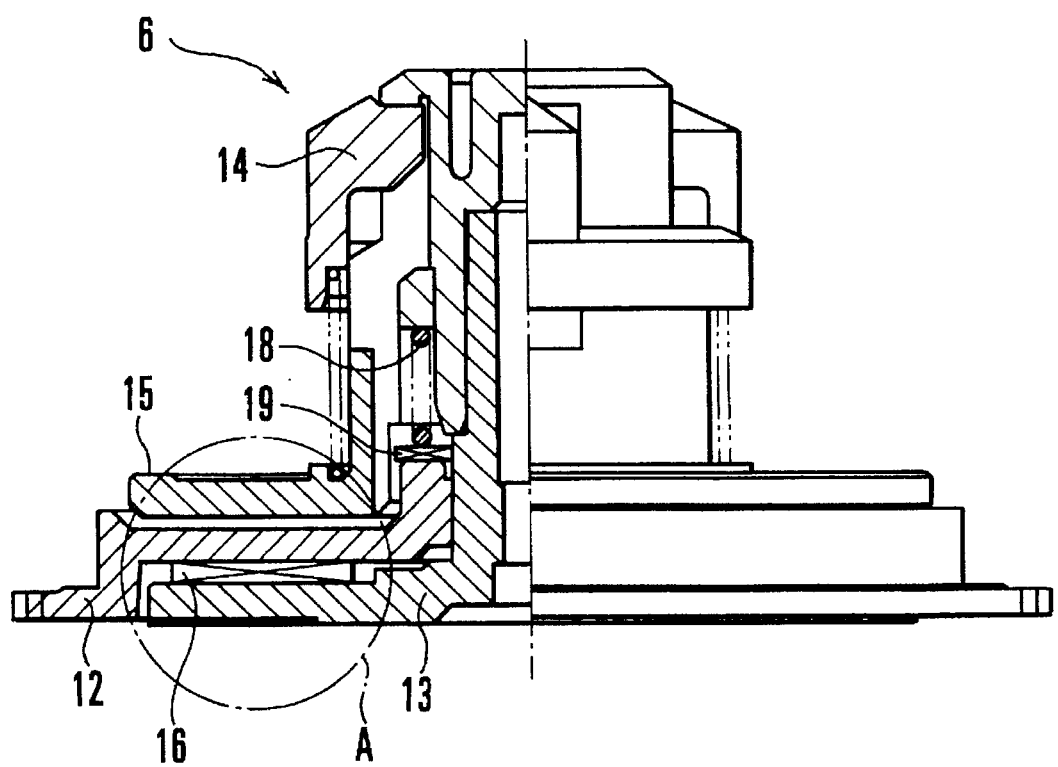
FIG. 4 is a sectional view showing a reel mount device included in each embodiment of the invention.
Figure 5:
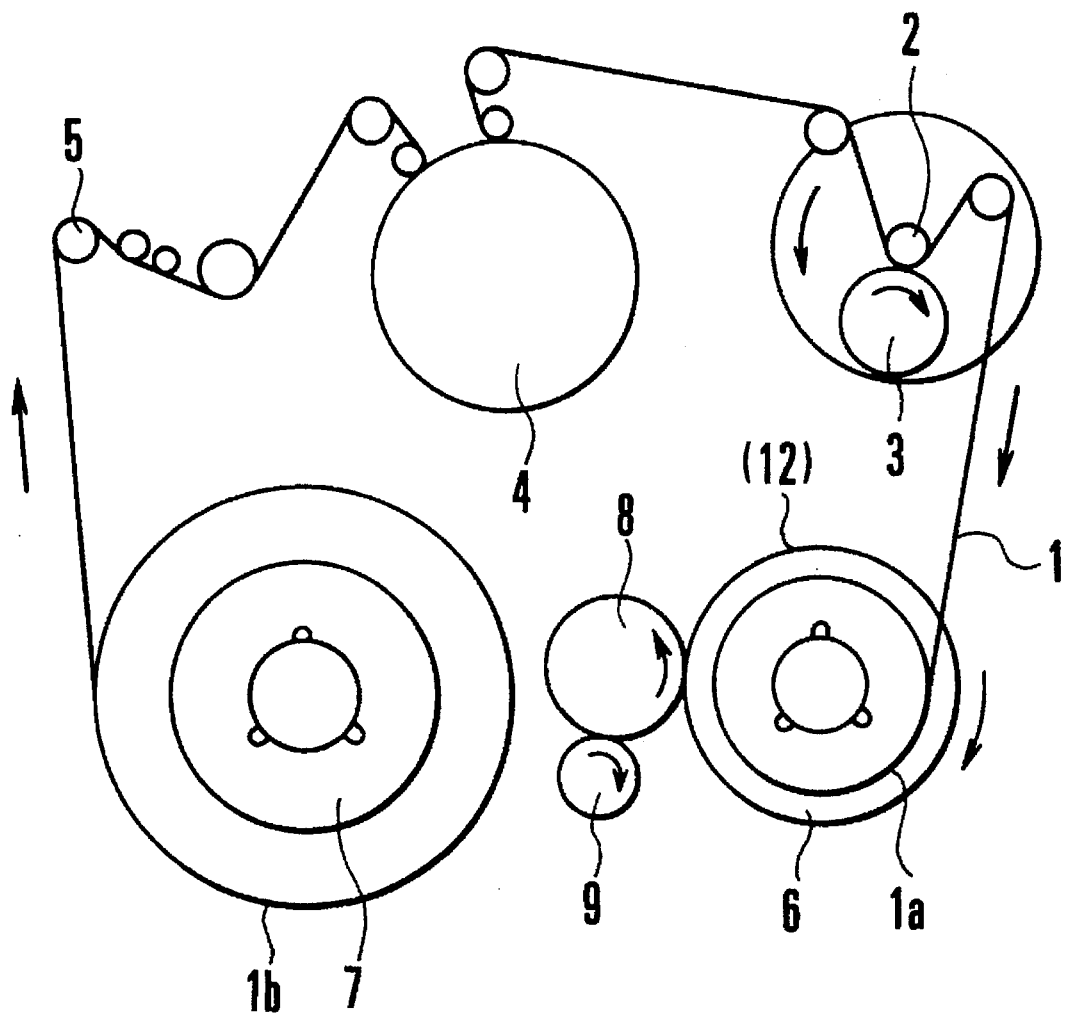
FIG. 5 is a schematic plan view showing the tape driving principle generally employed for an ordinary VTR.
Figure 6:
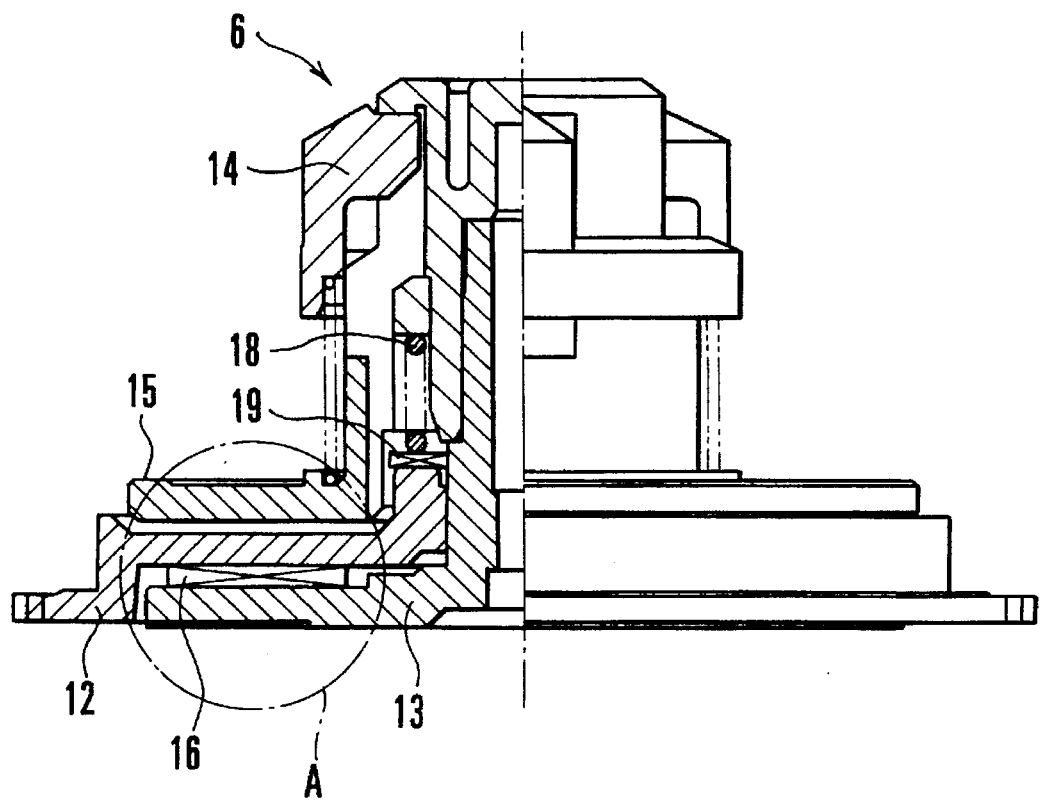
FIG. 6 is a sectional view showing the conventional reel mount device.
Figure 7:
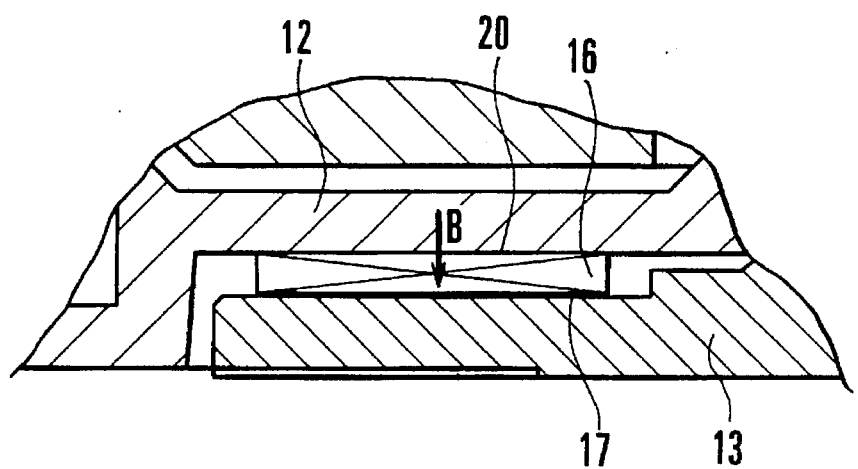
FIG. 7 is an enlarged sectional view showing essential parts of the conventional reel mount device.
Figure 8:
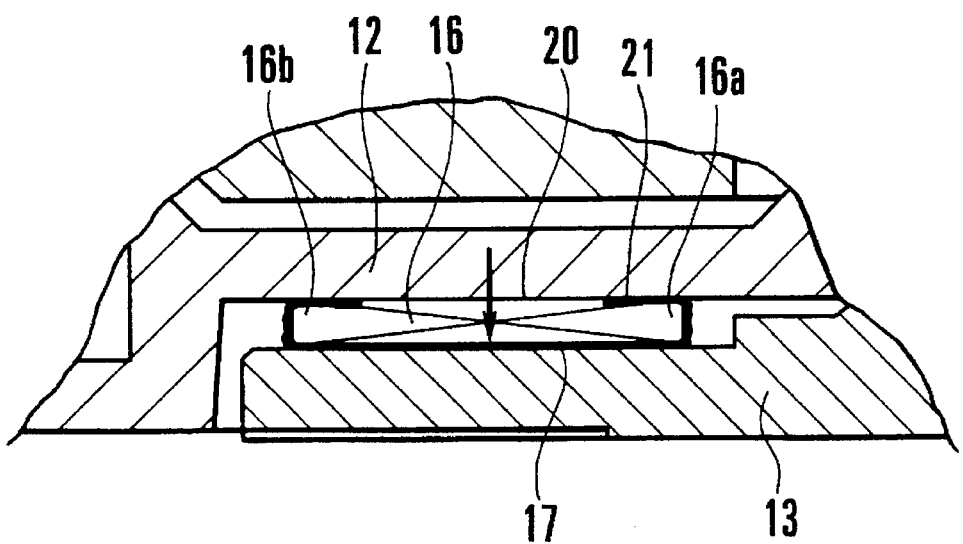
FIG. 8 is an enlarged sectional view showing how a pressure sensitive adhesive seeps in the conventional reel mount device.

FIG. 4 is a sectional view of a reel mount device of each of VTRs arranged as first, second and third embodiments of the invention as shown in FIGS. 1, 2 and 3 which are enlarged sectional views of essential parts, i.e., enlarged sectional views of a part A of FIG. 4. The structural arrangement of this reel mount device as a whole is about the same as that of the conventional reel mount device shown in FIG. 6. In FIGS. 1, 2, 3 and 4, all parts that are the same as those of the conventional device described in the foregoing are shown with the same reference numerals and are omitted from the following description. Further, since the reel mount device is adapted for the VTR shown in FIG. 5 and is arranged in the same manner as already described in the "Description of the Related Art", the details of the device are also omitted from the following description.

In the first embodiment which is shown in FIG. 1, a felt member 16 which is a friction member is fixed to the sticking face of a reel mount body 13 with a double-sided tape 17 serving as adhesion means. Two grooves 22a and 22b are provided in the sticking face of the reel mount body 13 to accumulate and retain a pressure sensitive adhesive seeping from the double-sided tape 17. The two grooves 22a and 22b are formed to be coaxial with the felt member 16 which is disc-shaped and are arranged in such a way as to straddle respectively the inner peripheral edge part 16a and the outer peripheral edge part 16b of the felt member 16. The pressure sensitive adhesive which is applied to the double-sided tape 17 tends to seep under a high temperature condition. However, the two grooves 22a and 22b effectively accumulate and retain the pressure sensitive adhesive seeping at the two peripheral edges parts 16a and 16b of the felt member 16. Therefore, the pressure sensitive adhesive never comes to the sliding face 20 of the reel mount gear 12.

In the second embodiment which is shown in FIG. 2, grooves 23a and 23b are formed in the sticking face of the reel mount body 13. In this case, the grooves 23a and 23b are in tapered shapes, gradually increasing their depth respectively from inner parts of the width of the felt member 16 toward the inner peripheral edge part 16a and the outer peripheral edge part 16b. This arrangement enables the second embodiment not only to effectively accumulate and retain the seepage of the pressure sensitive adhesive in the same manner as the first embodiment but also to lower bearing pressure on the felt member 16 at its both end parts 16a and 16b by virtue of the tapered shapes of the grooves 23a and 23b. The seeping of the pressue sensitive adhesive from the two end (peripheral edge) parts 16a and 16b, therefore, can be effectively reduced.

Next, in the case of the third embodiment shown in FIG. 3, a plurality of narrow grooves 24 each of which has a smaller sectional area than those of the first and second embodiments are provided all over the sticking face of the reel mount body 13 to which the felt member 16 is fixed. The seeping of the pressure sensitive adhesive toward the two end parts 16a and 16b caused by the pressed contact force on the felt member 16 is prevented by every one of the grooves 24. Therefore, the pressure sensitive adhesive can be effectively prevented from seeping at the two end (peripheral edge) parts 16a and 16b. In this case, the grooves 24 located innermost and outermost are preferably arranged to be straddling the edge (end) parts 16a and 16b of the felt member 16 in the same manner as in the cases of the first and second embodiments.

As mentioned above, the pressure sensitive adhesive is effectively prevented from seeping. Even if the pressure sensitive adhesive happens to seep, the seepage of the pressure sensitive adhesive can be accumulated and retained, so that the reel mount device can be compactly arranged, for reduction in size of the VTR, by reducing the diameter and thickness of the felt member 16 and strengthening the pressed contact force of the thrust spring 18.

The invention is not limited to the arrangement of the embodiments described. The arrangement can be variously changed and modified in accordance with the technological concept of the invention.

For example, while the embodiments described are arranged to stick the felt member to the reel mount body by means of a double-sided tape, the felt member may be replaced with some other friction slipping material such as a buff, leather, sponge, urethane resin or Mo polymer washer material. The double-sided tape also may be replaced with some other suitable adhesion means, such an adhesive to be used for direct sticking.

Each of the embodiments described is arranged to slip-rotate the reel mount body through a reel mount gear by bringing the sliding face of the reel mount gear into pressed contact with the felt member which is stuck to the sticking face of the reel mount body. However, in accordance with this invention, either of the two rotating elements, i.e., the reel mount body to which the friction member is applied and the reel mount gear which is to be brought into pressed contact with the friction member, may be arranged on the side of driving rotation while the other is arranged on the side of slipping rotation.

In accordance with the invention, as described above, a friction clutch mechanism in which a friction member such as a felt piece is stuck to the sticking face of one of two rotating elements is arranged to accumulate and retain a pressure sensitive adhesive of an adhesive member within a recessed part or parts provided in the sticking face even if the pressure sensitive adhesive happens to seep, for example, under a high ambient temperature condition, so that the seepage of the pressure sensitive adhesive can be prevented from moving around into the slipping face of the other rotating element. The invented arrangement, therefore, ensures a stable performance of a slipping function. Besides, the recessed parts can be easily formed in the sticking face without complicating the structural arrangement of the friction clutch mechanism and thus without causing any increase in cost.

Further, according to the invented arrangement of the reel mount device including the friction clutch mechanism, slipping between the reel mount driving element and the reel mount body can be effectively prevented from being inadequately performed due to the seepage of the pressure sensitive adhesive. Therefore, a reduction in diameter and thickness of the friction member and an increase in pressed contact force of the pressed contact means become possible, to permit reduction in size of the reel mount device and, hence, reduction in size of the VTR or the like.

What is claimed is:

1. A clutch mechanism comprising:
   a) first and second rotating elements supported to be rotatable coaxially;
   b) a transmission member fixed to a face of said first rotating element with an adhesive member;
   c) urging means for pushing said second rotating element against said transmission member; and
   d) a recessed part formed in the face of said first rotating element to which said transmission member is fixed, said recessed part being arranged to accumulate and retain a pressure sensitive adhesive seeping from said adhesive member.

2. A mechanism according to claim 1, wherein said transmission member is disc-shaped.

3. A mechanism according to claim 2, wherein said recessed part includes a plurality of grooves arranged in circular shapes which are concentric with said transmission member.

4. A mechanism according to claim 3, wherein said plurality of grooves include two groove parts arranged respectively to overlap an inner peripheral edge part and an outer peripheral edge part of said transmission member.

5. A mechanism according to claim 4, wherein said groove part located at the inner peripheral edge part of said transmission member is formed to have a sectional shape which gradually becomes deeper toward the center of rotation, and said groove part located at the outer peripheral edge part of said transmission member is formed to have a sectional shape which becomes deeper away from the center of rotation.

6. A mechanism according to claim 1 or 2, wherein said transmission member is made of felt.

7. An apparatus for recording and/or reproducing information on or from a tape, comprising:
   a) a first rotating element arranged to be rotated by a drive source;
   b) a second rotating element disposed coaxially with said first rotating element and arranged to engage a reel around which the tape is wound;
   c) a transmission member fixed to a face of one rotating element of said first and second rotating elements with an adhesive member;
   d) urging means for pushing the other rotating element of said first and second rotating elements against said transmission member; and
   e) a recessed part formed in the face of said one rotating element to which said transmission member is fixed, said recessed part being arranged to accumulate and retain a pressure sensitive adhesive seeping from said adhesive member.

8. An apparatus according to claim 7, wherein said one rotating element is said second rotating element and said other rotating element is said first rotating element.

9. A mechanism according to claim 8, wherein said transmission member is disc-shaped.

10. An apparatus according to claim 9, wherein said recessed part includes a plurality of grooves arranged in circular shapes which are concentric with said transmission member.

11. An apparatus according to claim 10, wherein said plurality of grooves include two groove parts arranged respectively to overlap an inner peripheral edge part and an outer peripheral edge part of said transmission member.

12. An apparatus according to claim 11, wherein said groove part located at the inner peripheral edge part of said transmission member is formed to have a sectional shape which gradually becomes deeper toward the center of rotation, and said groove part located at the outer peripheral edge part of said transmission member is formed to have a sectional shape which becomes deeper away from the center of rotation.

13. An apparatus according to claim 9, wherein said transmission member is made of felt.

14. A clutch mechanism comprising:
   a) first and second rotating elements supported to be rotated coaxially;
   b) a transmission member fixed to a face of said first rotating element with an adhesive member;
   c) urging means for biasing said second rotating element and said transmission member into engagement; and
   d) a recessed part formed in the face of said first rotating element to which said transmission member is fixed, said recessed part being arranged to accumulate and retain a pressure sensitive adhesive seeping from said adhesive member.

* * * * *